United States Patent [19]

Nagy

[11] 4,073,706

[45] Feb. 14, 1978

[54] BRINE TREATMENT FOR TRACE METAL REMOVAL

[75] Inventor: Zoltan Nagy, Mentor, Ohio

[73] Assignee: Diamond Shamrock Corporation, Cleveland, Ohio

[21] Appl. No.: 655,691

[22] Filed: Feb. 6, 1976

[51] Int. Cl.$^2$ ............................................. C25B 1/16
[52] U.S. Cl. ..................................... 204/98; 423/198
[58] Field of Search ............... 423/164, 198, 497, 499; 210/45, 47; 204/98, 128

[56] References Cited

U.S. PATENT DOCUMENTS

| | | | |
|---|---|---|---|
| 2,079,638 | 5/1937 | Sundstrom | 423/198 |
| 2,692,816 | 10/1954 | Vettel et al. | 423/164 |
| 2,861,867 | 11/1958 | Hirsch | 423/427 |
| 3,232,708 | 2/1966 | Chisholm | 423/164 |
| 3,275,410 | 9/1966 | Leatham et al. | 423/164 |
| 3,366,451 | 1/1968 | Waldron, Jr. et al. | 423/164 |
| 3,377,271 | 4/1968 | Cann | 210/47 |
| 3,751,559 | 8/1973 | Kanno et al. | 423/164 |
| 3,965,001 | 6/1976 | Irani et al. | 210/47 |
| 3,970,528 | 7/1976 | Zirngiebl et al. | 204/128 |

FOREIGN PATENT DOCUMENTS

| | | | |
|---|---|---|---|
| 1,961,779 | 7/1970 | Germany | 204/98 |

OTHER PUBLICATIONS

Riegel, Industrial Chemistry, Reinhold Publishing Corporation, Fifth Edition (1949).

*Primary Examiner*—O. R. Vertiz
*Assistant Examiner*—Wayne A. Langel
*Attorney, Agent, or Firm*—William A. Skinner

[57] ABSTRACT

Process for the removal of trace metals from alkali halide brines. The addition of controlled amounts of magnesium ions to brine and subsequent precipitation of magnesium hydroxide removes metal contaminants, and provides a brine suitable for use in the electrolytic production of chlorine and alkali metal hydroxide.

8 Claims, No Drawings

BRINE TREATMENT FOR TRACE METAL REMOVAL

FIELD OF THE INVENTION

This invention relates generally to a process for the treatment of brine, and more particularly concerns the introduction of magnesium ions into brine followed by precipitation as magnesium hydroxide to remove metallic impurities.

BACKGROUND OF THE INVENTION

Alkali metal chlorides in the form of natural or artificial salts and brines have widespread use in many industrial processes. In particular, the electrochemical production of chlorine, alkali metal hydroxide, and related products makes extensive use of alkali metal chloride brine. Nearly all commercial salts and brines are contaminated to some degree by various impurities, and while the level at which such impurities may be tolerated is dependent upon the specific process and method of operation, it is desirable in electrochemical uses to obtain a brine of comparatively high purity.

The presence of metallic impurities is of considerable concern in the electrolysis of brine to produce chlorine and alkali metal hydroxide, since trace metals encourage the evolution of hydrogen in the electrochemical cell. Such hydrogen generation is undesirable, as the combination of hydrogen, chlorine and oxygen forms an explosive mixture over a wide range of proportions. In practice it is preferred to limit the amount of hydrogen present in the chlorine to less than one percent. This is especially critical where the chlorine product is to be liquefied or absorbed, since the proportion of hydrogen in the remaining gas may quickly rise into the explosive range.

The effect of metallic impurities on hydrogen gas evolution in chlor-alkali cells has been extensively studied, and it has been determined that heavy metals such as vanadium, antimony, molybdenum and arsenic have a considerable catalytic effect on hydrogen formation in the cell. Many other metals such as aluminum, calcium, and magnesium also promote hydrogen evolution, and it has been found that combinations of two or more metals often have more effect than do the same metals taken separately, e.g. magnesium and iron form a synergistic pair. It has thus been the practice to reduce metallic impurities in electrolytic brine to the lowest possible level.

In the conventional purification processes, calcium has been removed from brine by the addition of alkali metal carbonate and the resultant precipitation of calcium carbonate. Iron and magnesium impurities have been removed by precipitation as the hydroxides, usually by the addition of alkali metal hydroxide. The sulfate radical is generally removed by the addition of a barium salt such as barium carbonate or barium chloride, which brings about the precipitation of barium sulfate. In these precipitation processes a coagulation, settling or filtering operation is used to rid the brine of the precipitated impurities prior to use.

However, these conventional purification techniques often fail to reduce the level of metals such as aluminum and heavy metals such as antimony, arsenic, molybdenum, and vanadium to the degree necessary for satisfactory use of the brine in electrochemical cells. It would therefore be desirable to provide a straightforward, efficient method for the removal of trace metal impurities from brine.

SUMMARY OF THE INVENTION

It has been discovered that the addition of magnesium ($Mg^{+2}$) ions to alkali metal chloride brine may be advantageously used to remove metallic impurities from the brine. Sufficient brine-soluble magnesium compound is introduced into the brine to establish a $Mg^{+2}$ concentration of at least 5 parts per million (ppm). The alkalinity of the brine is then adjusted to a pH of at least 8 to precipitate magnesium hydroxide. The $Mg(OH)_2$ precipitate is a large gelatinous floc which settles, trapping other undesirable metals present in the brine. Separating the precipitate from the brine effectively removes both the magnesium and the entrapped metal contaminants.

The process of the invention provides brine having a trace metal content suitable for the most sensitive chlor-alkali cell uses, and has the additional advantage of being easily adaptable to the brine purification processes generally in use in the industry. The process is unconventional in that prior brine purification processes have emphasized the importance of removal of magnesium contamination from the brine, rather than deliberate addition. However, it has been discovered that unless the magnesium content of the brine prior to treatment is higher than about five ppm, other metal impurities will not be effectively removed by the conventional purification techniques.

DETAILED DESCRIPTION OF THE INVENTION

In the practice of the process an alkali metal chloride brine, usually an aqueous solution of sodium chloride, is treated by the addition of soluble magnesium to obtain a level of at least about 5 ppm $Mg^{+2}$ in the brine. The magnesium is normally introduced in the form of magnesium chloride to avoid contamination of the brine with additional ionic species, although any brine-soluble magnesium salt is effective in achieving the object of the treatment. The magnesium salt can be in either solid or solution form. Levels of $Mg^{+2}$ less than about five ppm, which occur often in the brines used for chlor-alkali production, have been found to be ineffective in removing many of the other undesirable metal impurities. Much higher levels of $Mg^{+2}$ may be helpful in removing some of the contaminants, however there is little incentive to exceed $Mg^{+2}$ concentrations of about 200 ppm. A range of about 5 to about 30 ppm $Mg^{+2}$ in the brine is preferred for most effective removal of other metal impurities.

The pH of the brine is then adjusted to the range of about 8 to about 12 in order to initiate the precipitation of $Mg(OH)_2$ floc. In some instances the brine may be alkaline at the time the magnesium is introduced, and in other instances the pH is adjusted subsequent to magnesium addition. Both approaches are equally effective, and the choice is normally a matter of operating convenience.

The pH adjustment is normally effected with sodium hydroxide, although any alkaline material which does not introduce undesirable salts into the brine is satisfactory. In the conventional brine purification process for chlor-alkali cells, sodium hydroxide and sodium carbonate are added to the brine to remove undesirable impurities, and it is convenient to use this alkaline treatment to adjust the pH of the magnesium-treated brine. The addition of $Mg^{+2}$ to the brine at the same stage of purification as the $NaOH/Na_2CO_3$ treatment has the additional advantage of allowing the use of existing clarification and filtration apparatus to remove the $Mg(OH)_2$ floc. Separation of the $Mg(OH)_2$ from the brine may otherwise be effected by conventional techniques.

A typical brine feed for chlor-alkali electrolytic cells may contain heavy metal impurities such as arsenic, chromium, copper, iron, molybdenum, antimony, vanadium, tantalum, and titanium as well as other metallic impurities such as aluminum, calcium, magnesium, and strontium. Of all of these materials, only calcium will generally be present in more than trace amounts, i.e. in a concentration greater than about five ppm. The concentration of all of the metals except calcium and occasionally magnesium will normally be below one ppm. However, even at these low levels many of the metallic impurities can promote the undesirable formation of hydrogen in the cell. Thus the trace metal content of the feed brine must be reduced to the lowest possible level.

The conventional purification process involves the addition of sodium hydroxide, sodium carbonate, and barium or calcium chloride to the brine in a slight stoichiometric excess in order to precipitate the impurities. This process is satisfactory for the removal of calcium and certain of the trace metal contaminants such as copper, magnesium, and iron. However, if the brine does not contain sufficient magnesium many impurities fail to co-precipitate or absorb on the floc during the conventional purification. The improved process of the invention is successful in greatly reducing the level of such impurities, particularly aluminum, antimony, arsenic, molybdenum, strontium, tantalum and vanadium, to acceptable concentrations.

The invention further illustrated in the following specific examples.

EXAMPLE 1

A brine solution having a concentration of 310 grams per liter (gpl) was prepared using reagent grade NaCl. Portions of this stock solution were then fortified with a soluble metal salt to a concentration of 0.005 grams per liter (5 ppm) of the metal to be tested. The metal-containing brine samples were heated to about 65° C, and the various purification methods were simulated by the addition of either 0.15 gpl NaOH, 0.2 gpl $Mg^{+2}$ plus 0.15 gpl NaOH (over the stoichiometric equivalent of $Mg^{+2}$), or 0.25 gpl $Na_2CO_3$. After addition of the precipitating agent the solution was gently agitated for 15 minutes, then was allowed to stand for 6 hours at 65° C to insure complete precipitation. The solution was then filtered through a fine (4–5.5 micron) glass filter. The filtrate was acidified to a pH of 2 to insure the dissolution of any solids, then was analyzed by atomic absorption spectroscopy using standard analytical methods for each metal. The results are set forth in Table I.

TABLE I

| Metal | Percent Removed by: | | |
|---|---|---|---|
| | NaOH | $Na_2CO_3$ | $MgCl_2$ + NaOH |
| Al | 28 | 60 | 90 |
| Sb | 0 | 0 | 50 |
| $As^{+3}$ | 10 | 0 | 26 |
| $As^{+5}$ | 0 | 0 | 75 |
| Mo | 40 | 38 | 52 |
| Sr | 0 | 20 | 50 |
| Ta | 58 | 58 | 84 |
| $V^{+4}$ | 4 | 14 | 25 |
| $V^{+5}$ | 6 | 0 | 26 |

In each test, all (>99%) of the $Mg^{+2}$ added in the $MgCl_2$/NaOH treatment was removed from the brine by precipitation. These tests demonstrate the improved removal of trace metal impurities from brine by the addition of $Mg^{+2}$ prior to precipitation, as compared to the conventional precipitation methods.

EXAMPLE 2

A commercial $NaOH/Na_2CO_3$ brine purification treatment was conducted on a laboratory scale, and compared to the treatment process of the invention. Two liter batches of saturated NaCl brine containing 2.5 ppm Mg and 1.0 ppm aluminum were treated by both methods, held at 66° C for 20 minutes, then filtered through a 5 micron vinyl filter. The aluminum content of the filtrate was then determined. Results are set forth in Table II.

TABLE II

| Treatment | Mg(ppm) | Al in filtrate (ppm) | Reduction in Al |
|---|---|---|---|
| 0.1 gpl NaOH<br>0.7 gpl $Na_2CO_3$ | 2.5 | 1.0 | 0% |
| 0.1 gpl $MgCl_2 \cdot 6H_2O$<br>0.5 gpl NaOH<br>0.6 gpl $Na_2CO_3$ | 15 | 0.14 | 86% |
| 0.5 gpl $MgCl_2 \cdot 6H_2O$<br>0.5 gpl NaOH<br>0.6 gpl $Na_2CO_3$ | 62 | 0.26 | 74% |
| 1.0 gpl $MgCl_2 \cdot 6H_2O$<br>0.5 gpl NaOH<br>0.6 gpl $Na_2CO_3$ | 122 | 0.16 | 84% |

Tests similar to those summarized in Table II were conducted, eliminating the $Na_2CO_3$ treatment and in some cases the filtration. Unfiltered batches were allowed to settle and the supernatant was analyzed for Al content. Results are shown in Table III.

TABLE III

| Treatment | Mg(ppm) | Al in Product (ppm) | Al Reduction |
|---|---|---|---|
| 0.1 gpl $MgCl_2 \cdot 6H_2O$<br>0.5 gpl NaOH<br>1 hr. settling<br>Not filtered | 15 | 0.3 | 70% |
| 0.55 gpl $MgCl_2 \cdot 6H_2O$<br>0.9 gpl NaOH<br>3 hr. settling<br>Filtered (.45 micron filter) | 68 | 0.08 | 92% |
| 1.2 gpl $MgCl_2 \cdot 6H_2O$<br>0.9 gpl NaOH<br>3 hr. settling<br>Not filtered | 146 | 0.06 | 94% |
| 1.0 gpl $MgCl_2 \cdot 6H_2O$<br>0.5 gpl NaOH<br>3 hr. settling<br>Filtered (.45 micron filter) | 122 | 0.04 | 96% |

EXAMPLE 3

The purification process of the invention was carried out on the brine feed of a full-scale electrolytic chlor-alkali cellroom of the mercury type. Using the conventional $NaOH/Na_2CO_3$ purification treatment, the normal NaCl brine feed to this cellroom contained about 0.2 ppm Mg and 0.1 ppm Al. This feed brine allowed the cellroom to operate normally and produce chlorine gas with an acceptable hydrogen content of about 0.6 percent. It was the normal practice to mix a small stream of waste brine into the main stream of brine before purification. During a period of several weeks, the aluminum level in this waste stream increased, while other parameters remained constant. The normal brine treatment was not satisfactory to remove the aluminum, and its concentration built up to about 1.2 ppm in the treated feed brine. Concurrently, the hydrogen in the cell gas increased to the undesirable level of 2.4 percent even after a current reduction to 75% of full capacity. At this point an aqueous solution of $MgCl_2$ was continuously metered into the brine at a rate calculated to provide from 5-25 ppm $Mg^{+2}$ (or an average of about 10 ppm $Mg^{+2}$) in the brine. The $MgCl_2$ solution was injected after addition of NaOH and prior to the addition of $Na_2CO_3$ to the brine. After mixing, the brine was allowed to settle for 8-10 hours and was then filtered through a down flow sand and gravel system.

Within 24 hours after the $Mg^{+2}$ treatment was begun, the Al level in the feed brine had been reduced by 90%, and the cellroom could again be operated at full capacity with normal hydrogen evolution. Within 72 hours the Al concentration had decreased to less than 0.02 ppm.

While the invention has been described with particular reference to specific embodiments, it is evident that alternatives, modifications, and variations will be apparent to those skilled in the art in light of the foregoing description. Accordingly, it is intended to embrace all such alternatives, modifications, and variations as fall within the spirit and scope of the appended claims.

What is claimed is:

1. A method for reducing the trace metals content of an aqueous alkali metal chloride solution containing less than abaout 5 ppm of magnesium followed by electrolysis of the solution, which comprises
   a. adding soluble magnesium compound to the solution to establish a magnesium concentration of greater than 5 ppm,
   b. precipitating the magnesium as $Mg(OH)_2$,
   c. separating the precipitate containing said trace metals from the solution, and
   d. electrolyzing the solution to produce chlorine and alkali metal hydroxide.

2. Method as recited in claim 1 wherein the magnesium is precipitated by adjusting the solution pH to the range of abaout 8 to about 12.

3. Method as recited in claim 2 wherein the pH is adjusted by the addition of NaOH.

4. Method as recited in claim 1 wherein the trace metals present in the solution include at least one of aluminum, antimony, arsenic, molybdenum, strontium, tantalum, or vanadium.

5. Method as recited in claim 1 wherein the alkali metal chloride is sodium chloride.

6. Method as recited in claim 1 wherein the soluble magnesium compound is $MgCl_2$.

7. Method as recited in claim 1 wherein the $Mg^{+2}$ concentration is established in the range of 5-200 ppm.

8. Method as recited in claim 1 wherein the precipitate is separated from the solution by filtration.

* * * * *